June 28, 1960 G. A. LYON 2,942,916
WHEEL COVER
Original Filed March 27, 1953
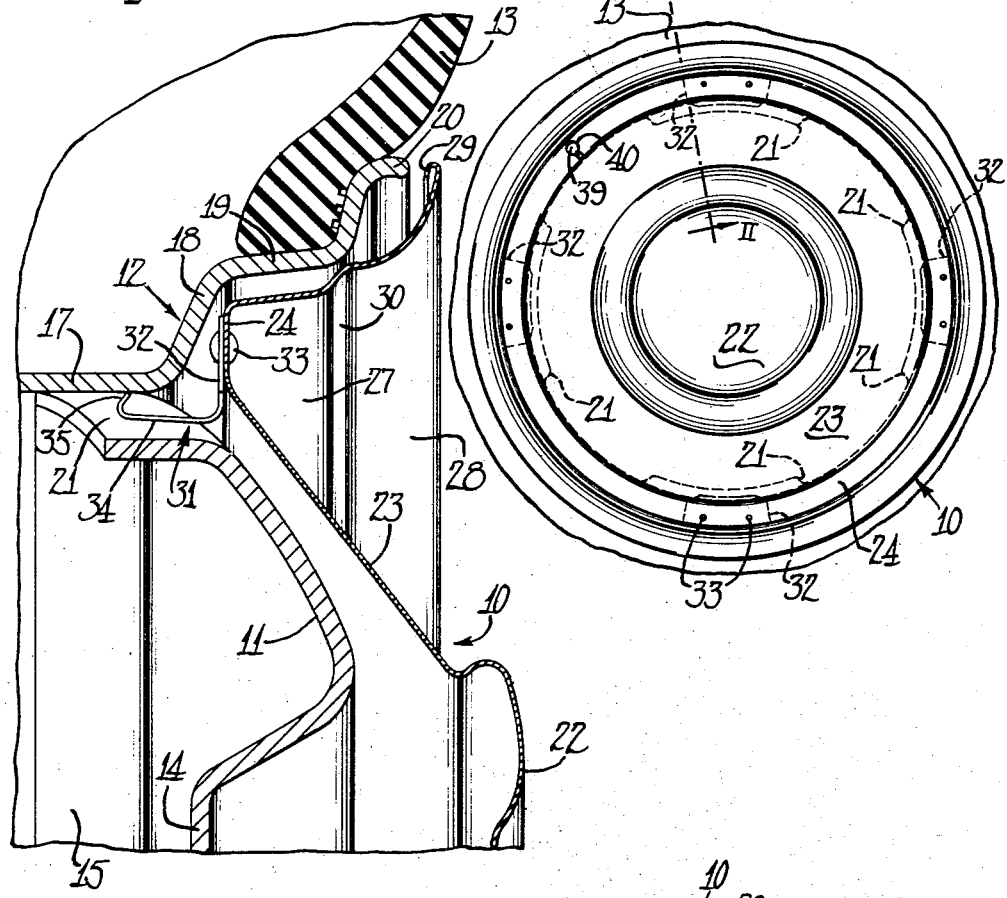
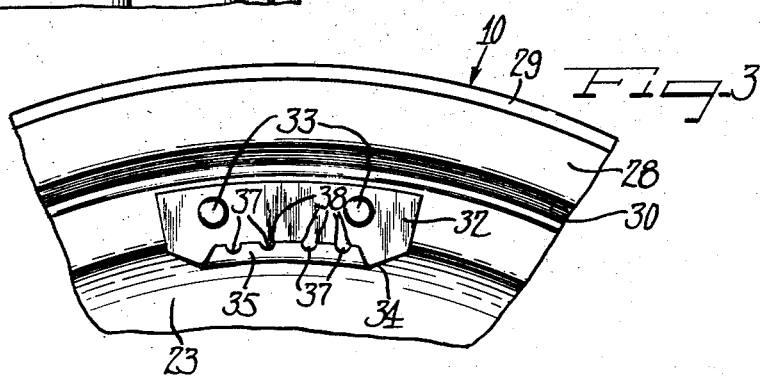
Inventor
George Albert Lyon
by Hill, Sherman, Meroni, Gross & Simpson Attys

United States Patent Office 2,942,916
Patented June 28, 1960

2,942,916

WHEEL COVER

George Albert Lyon, 13881 W. Chicago Blvd., Detroit, Mich.

Original application Mar. 27, 1953, Ser. No. 345,197, now Patent No. 2,757,984, dated Aug. 7, 1956. Divided and this application May 22, 1956, Ser. No. 586,536

3 Claims. (Cl. 301—37)

The present application is a division of my copending application Serial No. 345,197, filed March 27, 1953, now Patent No. 2,757,984.

The present invention relates to improvements in wheel structures, and more particularly concerns the provision of improved ornamental and protective cover means for the outer sides of vehicle wheels.

An important object of the present invention is to provide a wheel structure including improved cover means for the outer side of the wheel.

Another object of the invention is to provide in a wheel structure a cover including novel means for the self-retention of the cover upon the outer side of the wheel.

A further object of the invention is to provide an improved wheel cover having novel self-retaining means efficiently engageable with the tire rim of a vehicle wheel under conditions of limited clearance.

Still another object of the invention is to provide an improved retaining clip structure for covers of the easy-on, hard-off type.

Other objects, features and advantages of the present invention will be apparent from the following detailed description of a preferred embodiment thereof taken in conjunction with the accompanying drawings in which:

Figure 1 is a front elevational view of a vehicle wheel structure embodying the features of the present invention;

Figure 2 is an enlarged radial section taken substantially on the line II—II of Figure 1; and Figure 3 is a rear elevational view of a portion of the cover showing one of the retaining spring clips.

A cover 10 embodying features of the present invention is adapted to be applied in press-on, pry-off relation to the outer side of a vehicle wheel including a wheel body 11 and a tire rim 12 of the multi-flange, drop-center type adapted to support a pneumatic tire 13.

The wheel body 11 is preferably of the disk spider type comprising a heavy gauge sheet metal stamping provided with a central bolt-on flange 14 and an outer generally axially inwardly extending attachment flange 15 secured in suitable fashion to a base flange 17 of the tire rim. At the outer side of the tire rim a side flange 18 extends generally radially outwardly and faces generally axially outwardly and merges with a generally axially outwardly and radially outwardly sloping intermediate flange 19. At its axially outer extremity the intermediate flange merges with a generally radially outwardly extending and then axially outwardly turned terminal flange 20. At juncture of the wheel body with the tire rim, the attachment flange 15 is inset at suitable spaced intervals such as three or four to provide wheel openings 21.

In a preferred form, the cover 10 is formed from suitable thin gauge sheet material such as stainless steel, brass, aluminum or the like by suitable press or drawing equipment. Centrally the cover has a crown portion 22 adapted to overlie the bolt-on flange portion of the wheel body. At its side the crown portion has a generally radially outwardly and axially inwardly extending, in this instance frusto-conically shaped, side wall portion 23 which extends in closely spaced adjacent relation to the bulging portion of the wheel body and into the deep juncture groove between the wheel body and the tire rim intermediate flange 19.

At its radially outer and axially inner extremity, the side wall portion 23 is adapted to generally overlie the juncture of the wheel body and the tire rim and merges with an inwardly generally dished portion 24 which in the present instance is adapted to lie in adjacent spaced relation to the side flange 18 of the tire rim and provides a generally axially inwardly facing annular rib which is generally flat faced on its inner side. From the radially outer side of the intermediate indented portion 24 extends generally axially outwardly a marginal cover portion 27 that extends from adjacent opposition to the intermediate flange 19 into overlying relation to the terminal flange 20 and provides an outer generally rib-like reinforced marginal extremity portion 28. The marginal extremity portion 28 terminates in a turned reinforcing and finishing bead-like outer peripheral flange 29. Radially inwardly spaced from its extremity, the cover portion is provided with an indented annular pry-off and reinforcing rib 30 disposed between the generally radially outwardly extending outer marginal portion 28 and the generally axially inwardly extending cover portion 27 which is arranged to be generally telescopically disposed relative to the intermediate flange 19.

It will be observed that the several circular or annular portions of the cover are constructed to be so closely related to the opposing portions of the wheel as hardly to afford enough room for accommodating retaining means such as retaining fingers or clips. Accordingly, retaining spring finger clip means comprising retaining clip structures 31 are provided on the cover for engagement with the wheel within the wheel openings 21. Each of the retaining fingers 31 has a base flange 32 in face-to-face engagement with the inner surface of the rib 24 of the cover and secured thereto as by means of rivets 33. From the radially inner margin of the base 32 extends generally axially inwardly a resilient clip leg or arm 34 arranged to project into one of the wheel openings 21. At the axially inner end of the clip leg 34 is a retaining terminal engageable with a wheel surface within the wheel opening 21 and in the present instance comprising a short and stiff generally axially outwardly and radially oblique turned terminal flange 35 with the edge extremity thereof arranged for gripping generally biting retaining engagement with the wheel surface. In the illustrated example, the retaining terminal flange 35 is directed obliquely generally radially outwardly for engagement with the radially inwardly facing surface of the tire rim base flange 17. It will be observed that the retaining terminal 35 is substantially shorter than the space between the base flange 17 and the inset portion of the wheel body flange 15 so that a substantial range of radial flexure of the clip legs 31 is permitted incident to deflection from a slightly larger diameter described about the retaining finger tips than the inside face of the base flange 17 incident to application of the cover to the wheel.

It will be appreciated, of course, that the retaining fingers 31 are provided in suitable plurality and uniformly circumferentially spaced about the cover rib 24 in accordance with the spacing of the wheel openings 21. Moreover, the resilient clip arm 31 may be substantially wider at the base or juncture end thereof than at the tip, thereby assuring strong resilient tensioning of the retaining finger arm but nevertheless adequate resilient deflectability for pressing on and removal of the cover.

Desirably, the retaining terminal flange 35 may be notched as shown at 37 to provide a multiplicity of anti-turn or torque resisting corners 38 so as to avoid undue turning of the cover relative to the wheel. Thereby twisting of a valve stem 39 projecting through a suitable aperture 40 in the cover rib 24 is avoided.

In applying the cover 10 to the outer side of the wheel, the valve stem opening 40 is centered or registered with the valve stem 39 and the cover pressed axially inwardly to effect retaining engagement of the wheel by the retaining fingers 31. In the assembled relationship of the cover with the wheel the flat radially extending clip base portions 32 and the rivets 33 require so little clearance space that the cover rib 24 can be disposed quite close to the outer side flange 18 of the tire rim. Yet the retaining fingers will adequately hold the cover on the wheel since they have the legs 31 thereof adequately accommodated within the wheel openings.

For removing the cover from the wheel, a pry-off tool may be applied behind the reinforced outer marginal portion 29 of the cover and pry-off leverage applied against the cover using the underlying terminal flange 20 of the tire rim as a fulcrum. As the pry-off progresses, the secondary pry-off rib 30 may be used to advantage in completing the pry-off.

It will be understood that modifications and variations may be effected without departing from the scope of the novel concepts of the present invention.

I claim as my invention:

1. In a wheel structure including a wheel body and a tire rim having a generally radially inwardly facing flange, a cover for disposition at the outer side of the wheel comprising a cover body for overlying the tire rim and the wheel body, said cover body having on the inner side thereof opposite the tire rim a series of retaining spring fingers having generally radially extending base portions attached to the cover body and resilient legs extending freely from the base portions and including generally axially extending resilient leg portions arranged to be disposed adjacent to said rim flange, said leg portions having angled obliquely therefrom short and stiff generally radially extending terminal flanges provided with edges retainingly gripping said rim flange in press-on, pry-off relation under resilient stress of said legs, said legs being of substantial length and extending axially generally away from said base portions enabling the legs to be received in openings between the tire rim and the wheel body, and said terminal flanges being substantially shorter than the radial depth of the openings to permit free radial resilient flexing of the resilient leg portions.

2. In a wheel structure including a wheel body and a tire rim including a base flange with an axially outwardly facing side flange joining the same and with a wheel body flange providing with the base flange wheel openings within which the base flange and body flange provide opposed spaced walls, a cover for disposition at the outer side of the wheel including a circular cover body having a deeply dished annular rib like portion arranged for assembly closely adjacent to said side flange, and cover retaining means comprising a plurality of cover retaining fingers carried by the inner side of said cover rib, said retaining fingers having base portions extending generally radially and secured to the inner side of said rib and with generally axially inwardly extending resiliently radially flexible clip legs extending generally axially inwardly from the radially inner ends of the base portions and arranged to extend into said wheel openings and having cover retaining terminals thereon retainingly engageable in press-on, pry-off relation with one of said wheel walls, said terminals being substantially shorter than the spacing between said walls to enable free resilient radial flexing of the clip legs in said spacing.

3. In a wheel structure including a wheel body and a tire rim including a base flange with an axially outwardly facing side flange joining the same and with a wheel body flange providing with the base flange wheel openings within which the base flange and body flange provide opposed spaced walls, a cover for disposition at the outer side of the wheel including a circular cover body having a deeply dished annular rib like portion arranged for assembly closely adjacent and in overlying relation to said side flange, and cover retaining means comprising a plurality of cover retaining fingers carried by the inner side of said cover rib, said retaining fingers having base portions extending generally radially and secured to the inner side of said rib to overlie said rim side flange and with generally axially inwardly extending resiliently radially flexible clip legs of substantial length on the radially inner ends of the base portions arranged to extend into said wheel openings and having cover retaining terminals thereon retainingly engageable with one of said wheel walls, said clip terminals comprising short and stiff generally axially outwardly and radially oblique retaining terminals which are substantially shorter than the space between said wheel opening walls to enable resilient flexing of the legs when pressing the cover into engaged relation on the wheel.

References Cited in the file of this patent

UNITED STATES PATENTS

| | | |
|---|---|---|
| 2,579,506 | Lyon | Dec. 25, 1951 |
| 2,725,257 | Maurer et al. | Nov. 29, 1955 |

FOREIGN PATENTS

| | | |
|---|---|---|
| 449,040 | Great Britain | June 19, 1936 |